United States Patent [19]
Gran et al.

[11] Patent Number: 5,560,589
[45] Date of Patent: Oct. 1, 1996

[54] ACTIVE VIBRATION DAMPING ARRANGEMENT FOR TRANSPORTATION VEHICLES

[75] Inventors: Richard Gran, Farmingdale; Michael Proise, Garden City, both of N.Y.

[73] Assignee: Northrop Grumman Corporation, Los Angeles, Calif.

[21] Appl. No.: 501,624

[22] Filed: Jul. 12, 1995

[51] Int. Cl.⁶ ............................ F16F 13/00; B60G 17/01
[52] U.S. Cl. .................. 267/3; 267/140.5; 105/199.2
[58] Field of Search .................. 267/3, 218, 225, 267/64.16, 64.26, 64.28, 140.11, 140.3, 140.5; 105/199.1, 199.2

[56] References Cited

U.S. PATENT DOCUMENTS

| Re. 28,815 | 5/1976 | Schmiterlow | 105/199.2 |
|---|---|---|---|
| 4,083,433 | 4/1978 | Geohegan, Jr. et al. | 188/382 |
| 4,337,706 | 7/1982 | Loosli | 105/199.1 X |
| 4,715,289 | 12/1987 | Okamoto et al. | 267/3 X |
| 4,892,273 | 1/1990 | Fedor . | |
| 4,924,943 | 5/1990 | Maichle . | |
| 5,086,564 | 2/1992 | Schalz . | |
| 5,159,881 | 11/1992 | Durand et al. | 105/199.2 |
| 5,199,690 | 4/1993 | Marshall | 267/64.26 X |
| 5,332,203 | 7/1994 | Gossman et al. | 267/140.15 |

FOREIGN PATENT DOCUMENTS 2079701  1/1982  United Kingdom ............. 267/3

*Primary Examiner*—Josie Ballato
*Attorney, Agent, or Firm*—Terry J. Anderson; Karl J. Hoch, Jr.

[57] ABSTRACT

An active vibration damping arrangement which is adapted to improve passenger ride comfort in various types and categories of transport vehicles; especially such as, but not limited to railroads, buses, automotive devices, maglev (magnetic levitation) vehicles, trains and people mover devices in general. In essence, pursuant to specific physical applications and uses, the active motion and vibration damping arrangement is intended to provide a suitable supplemental damping system installed in addition to currently employed so-called passive vibration dampers which are widely employed in connection with such vehicles, transportation devices, vibration-susceptive machinery and the like. The active motion and vibration damping arrangement includes a pair of actuators which; for example, may be constituted from hydraulic cylinder piston units or the like, each of which has respectively one end thereof connected, for instance, to a railroad car body, and the opposite end to the compartment floor of a passenger compartment which is subjected to vibrations and/or swaying and heaving motions encountered by the car body transmitted thereto due to varying road bed or rail conditions or irregularities transmitted through the wheel, truck, car body and, in essence, the normally installed passive vibration damping arrangement, towards the compartment floor.

8 Claims, 2 Drawing Sheets

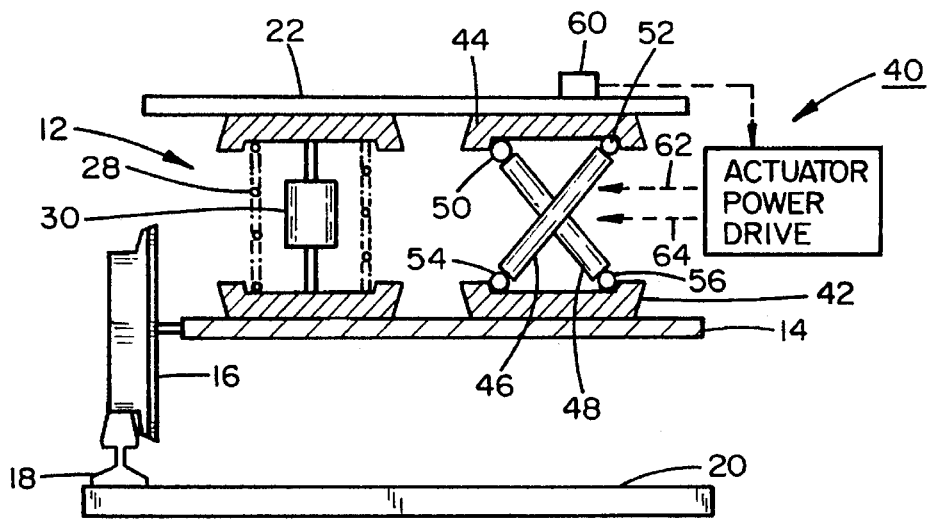

ACTIVE VIBRATION DAMPING ARRANGEMENT FOR TRANSPORTATION VEHICLES

BACKGROUND OF THE INVENTION

1. Field of the Invention

The present invention relates to a novel active motion and vibration damping arrangement and, in particular, pertains to an active vibration damping arrangement which is adapted to improve passenger ride comfort in various types and categories of transport vehicles; especially such as, but not limited to railroads, buses, automotive devices, maglev (magnetic levitation) vehicles, trains and people mover devices in general. In essence, pursuant to specific physical applications and uses, the inventive and uniquely employed active motion and vibration damping arrangement is intended to provide a suitable supplemental damping system installed in addition to currently employed so-called passive vibration dampers which are widely employed in connection with such vehicles, transportation devices, vibration-susceptive machinery and the like.

2. Discussion of the Prior Art

At the current time, most transportation systems comprising; for example, railway cars, buses, trucks, automobiles, maglev vehicles (of both the high and low speed type) and people movers (such as escalators or moving sidewalks) employ passive damping devices which ordinarily utilize mechanical and/or air springs in providing for their secondary suspension systems. Such passive damping devices are essentially adapted to attenuate high-frequency vibrations which are encountered; for example, such as are generally above 2 Hz, whereby such vibrations are generated and introduced into the vehicles or trains when these are traveling over irregularities; for example, those present in steel rails, guideways or rough roadways. These high-frequency vibratory disturbances are frequently attenuated by positioning a damper comprising a spring-mass combination between the car body and the passenger compartment floor of trains or vehicles, so as to form a suspension system. Although this is generally effective in attenuating or even eliminating high-frequency disturbances or vibrations, there is encountered the disadvantage of introducing low-frequency heave and sway motions into the passenger compartments of such vehicles. Frequently, such low-frequency vibrations or motions are physically acceptable to the vehicle or train passengers, but do not facilitate the ability of easily reading, writing or walking in the passenger cabin of the vehicle or train such as would be normally encountered with an airplane smoothly flying in calm air conditions. A drawback or limitation of passive dampers which are currently widely employed in this technology resides in that these dampers possess inherently low damping characteristics near the natural frequency of the spring/mass secondary suspension systems installed in the vehicles. For example, the usual damping factor for such suspension systems is approximately 0.3, whereas a value of about 0.8 would be more desirable, but is difficult to implement in a passive mechanical vibration and motion damping structure.

In order to improve upon the motion and vibration damping systems of the current technology, which, as indicated hereinabove, are primarily passive in nature, supplemental active motion damping systems have been proposed or utilized in lieu of such passive damping systems.

Thus, for instance, active vibration dampers with reactive force producing pistons are disclosed in Gossman et al. U.S. Pat. No. 5,332,203, wherein an active vibration damper which is effective in a simple direction or along one axis is positioned between an automotive engine and a chassis, and is adapted to be controlled by opposedly located force motors acting on a fluid piston arrangement responsive to an accelerometer. Such an active vibration damper may be utilized either alone or as a supplement to normally employed passive vibration damping arrangements or systems, such as springs and dashpot combinations, as is well known in the technology.

Schalz U.S. Pat. No. 5,086,564 discloses an active vibration damping device and method, whereby an active vibration and motion damper may be interposed near a first end of a beam and an actuator responsive to a control located near a second end of a beam so as to control vibrations acting in one direction.

Maichle U.S. Pat. No. 4,924,943 discloses an agricultural tractor or the like including an active vibration damper which may be utilized in conjunction with a passive damping system or spring/mass unit in order to attenuate vibration forces encountered by the tractor vehicle. The active vibration damper, which acts primarily in one direction, is employed also to dampen pitch vibrations of the vehicle when traveling on rough terrain and decrease adverse influences over the range in the driving characteristics of the vehicle.

Fedor U.S. Pat. No. 4,892,273 and Geohegan, Jr.. et al. U.S. Pat. No. 4,083,433 each disclose active vibration dampers, wherein Fedor is directed to damping vibrations in spacecraft structures and Geohegan, Jr. et al. is directed to primarily provide for signal processing in detecting undue vibrations in a drive unit.

The foregoing types of active vibration and motion damping systems and arrangements, although generally satisfactory within their particular functional parameters and specific physical utilizations; however, fail to provide for multi-axis active motion and vibration damping which is able to reduce to an appreciable extent or even completely attenuate or suppress motion and vibration effects in heaving and sway directions which are encountered by vehicles and other motive structures as described herein, and to increase, either independently or as a supplement to possible passive damping devices, the overall effective range in the damping of motions and vibrations over considerably broader frequency ranges and to thereby significantly decrease encountered disturbance levels in vehicular passenger compartments to acceptable values, thereby considerably enhancing passenger comfort while traveling in such vehicles or other types of conveyances.

SUMMARY OF THE INVENTION

Accordingly, in order to significantly improve upon active motion and vibration damping arrangements or systems as currently employed in the technology, the present invention provides for an arrangement of that type which is particularly adapted to improve upon the attenuation or elimination of undue motions and vibrations both as to heaving and swaying motions which are ordinarily encountered in a passenger compartment of a moving conveyance, such as a railroad train, maglev vehicle of all kinds, buses, trucks or automobiles, or people movers, so as to render the conditions of comfort encountered by passengers of such conveyances to be highly acceptable and satisfactory in nature. In this connection, the active motion and vibration damping arrangement pursuant to the invention is especially adapted to be employed as a supplement to generally known passive vibration damping systems, although it is conceivable that it may be utilized inherently independently per se so as to enhance damping ratios for such vibration frequencies to a response level which will significantly decrease any discernable disturbance levels.

In order to assist in the foregoing, the inventive active motion and vibration damping arrangement includes a pair of actuators which; for example, may be constituted from hydraulic cylinder piston units or the like, each of which has respectively one end thereof connected, for instance, to a railroad car body, and the opposite end to the compartment floor of a passenger compartment which is subjected to vibrations and/or swaying and heaving motions encountered by the car body transmitted thereto due to varying road bed or rail conditions or irregularities transmitted through the wheel, truck, car body and, in essence, the normally installed passive vibration damping arrangement, towards the compartment floor.

Pursuant to preferred aspects of the invention, the actuators may comprise a pair of mutually angled or skew-oriented hydraulic cylinder-piston units so as to form either an X-shaped or a V-shaped arrangement, and are operatively connected through the intermediary of an accelerometer, which is essentially a two-axis accelerometer fastened to the passenger compartment floor, and which senses any and especially undue sway and heaving motions encountered by the passenger compartment so as to cause an actuator power drive which is operatively interconnected between the accelerometer and the actuators to responsively cause the actuators to compensate for such vibratory or motion effects whereby these are considerably attenuated to acceptable comfort levels for passengers riding in the passenger compartment.

Accordingly, it is a primary object of the present invention to provide an improved active motion and vibration damping arrangement for attenuating vibratory and motion effects encountered by conveyances or motive structures responsive to external influences imparted thereto.

A more specific object of the present invention resides in providing an active motion vibration arrangement comprising at least two actuators mounted in predetermined angular orientations relative to each other so as to be able to compensate for undue heaving and swaying motions encountered by portions of a vehicle or transport structure responsive to external influences exerted thereon.

Still another object of the present invention is to provide for a novel active motion and vibration damping arrangement of the type described herein which may be installed as an auxiliary or a supplement to a passive vibration and motion damping structure normally interposed between a car body and a passenger compartment floor of a vehicle or similar type of conveyance or people-mover installation.

BRIEF DESCRIPTION OF THE DRAWINGS

Reference may now be had to the following detailed description of preferred embodiments of the invention showing various active motion and vibration damping arrangements, taken in conjunction with the accompanying drawings; in which:

FIG. 3 illustrates a generally diagrammatic representation of composite passive and active rail car suspension systems in which the active motion and vibration damping arrangement is constructed pursuant to the invention;

FIG. 4 illustrates, in transverse cross-section, a physical example of an inventive active vibration and motion damping system installed on a tilt train; and FIG. 4a illustrates an enlarged fragmentary view of the active vibration and motion damping system of FIG. 4.

DETAILED DESCRIPTION OF PREFERRED EMBODIMENTS

Figure 1:
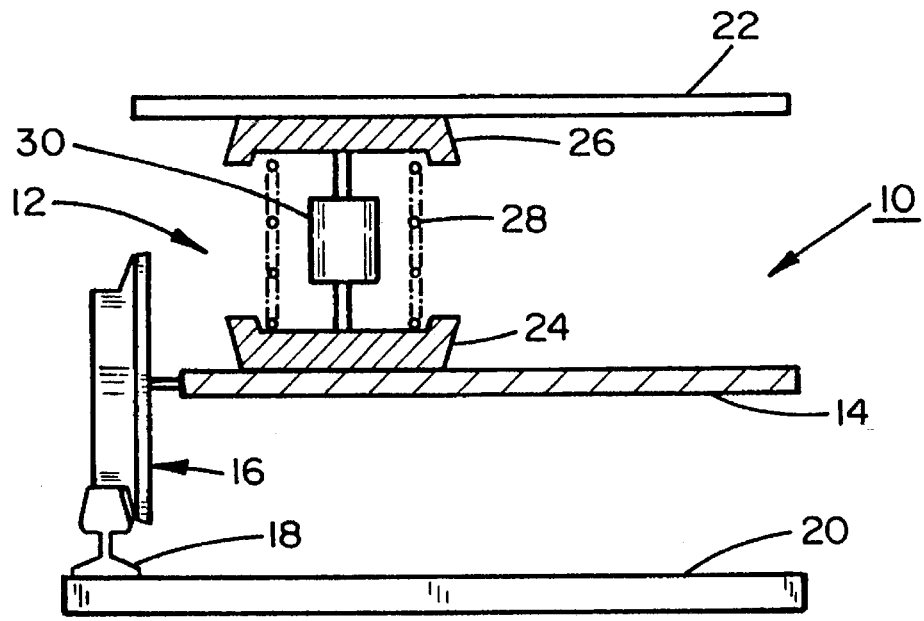
FIG. 1 illustrates a representative rail car suspension system incorporating a passive vibration and motion damping system pursuant to the current state of the art.

Referring in specific detail to FIG. 1 of the drawings, there is illustrated a diagrammatic representation of a typical segment of a train rail car truck installation 10 incorporating a passive vibration damping support system 12.

In this connection, the car body or chassis 14 of the rail car truck installation 10 is shown as being connected to a railway wheel 16 which is rollably supported on a steel rail 18 mounted on the cross-tie of a rail bed 20, as is well known in railway constructions. Extending at a distance above the car body 14 is the compartment floor 22 of a rail car passenger compartment, and which has the passive vibration support system 12 interposed between car body 14 and compartment floor 22. A lower support member 24 of the suspension system rests on the car body 14; whereas an upper support member 26, both of which may essentially be of dished plate or disk configurations, are supported against or mounted on the lower surface of the passenger compartment floor 22. Extending between the support members or dished plates 24 and 26 is a helical compression spring unit 28, and whereby a dashpot 30, which may be a suitable hydraulic or pneumatic or electrical piston-unit cylinder, provides for secondary passive vibration and vertical motion damping. This type of support system for rail cars or other kinds of vehicular and motion structures is basically a passive motion and vibration damping device fundamentally currently widely employed in the technology, whereby such passive vibration damping installations or systems possess inherently low damping characteristics near the natural frequency of the spring/mass secondary suspension system 28, 30.

Figure 2:
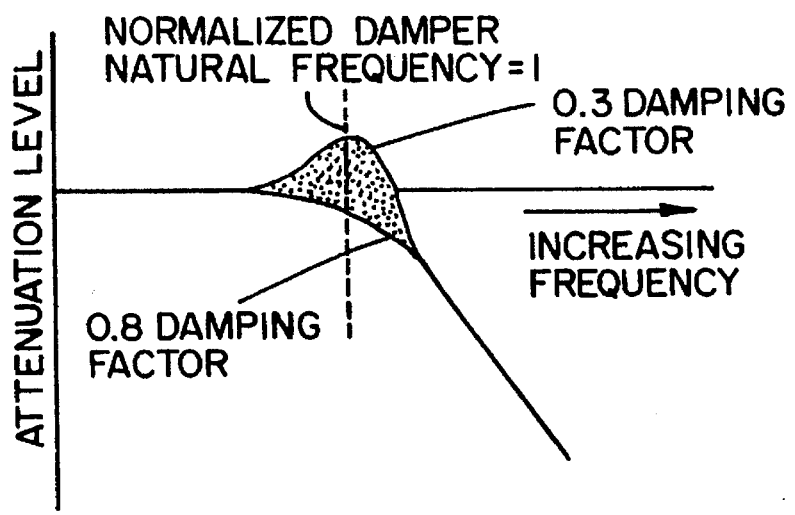
FIG. 2 illustrates a graphical representation of frequency responses of a damping system with different damping factors.

As is illustrated in FIG. 2 of the drawings, the 0.3 damping factor of passive supports and vibration damping systems provides for a frequency response whereby the usual damping factor is at the aforementioned value of 0.3, whereas a damping factor of 0.8 would be more ideal or desirable, but is difficult to mechanically implement for such passive vibration systems. Thus, FIG. 2 illustrates the difference in response for the two damping factors; in effect, for passive and active systems, whereby there is an effective attenuation obtained by both systems at ranges above the normalized natural frequency of the system. However, in the vicinity of or approach to the natural frequency, the difference in attenuation is less by a factor of almost 3 for a passive damper than for an active damper, the latter of which would possess a damping ratio of up to a value of 0.8; resultingly significantly reducing disturbances near the natural frequency, particularly as to heave and sway motions.

As illustrated in the inventive vibration and motion damping arrangement represented in FIG. 3 of the drawings, wherein elements which are similar to or identical with those in FIG. 1 are identified by the same reference numerals, in this instance, there is additionally provided in proximity to the passive vibration damping system 12, a supplemental active motion and vibration damping arrangement 40, in which, as in the passive vibration damping system 12, there is provided a lower disk-like support or dished plate unit 42 resting or mounted on the upper surface of the car body 14; and an upper plate or support unit 44 supported against or mounted on the lower surface of the passenger compartment floor 22.

In that instance, interposed between the support units 42 and 44 are a pair of actuators 46 and 48 each of which may have their respective upper and lower ends 50, 52, and 54, 56 connected to the respective lower and upper support units 42 and 44. The actuators 46, 48 which may be suitable hydraulic or electrical devices, such as piston-cylinder structures or devices using magnetic coils that could use superconducting magnets, are arranged, as shown in FIG. 3 of the drawings, at angular or skewed orientations relative to each other and to the vertical, so as to form essentially an X-shaped configuration which, upon suitable actuation of the respective actuators 46 and 48, is adapted to provide compensation with respect to swaying and heaving motions encountered by the compartment floor 22, and resultingly the passenger compartment.

To that effect, mounted on the floor 22 of the compartment is a suitable two-axis accelerometer 60 which is operatively interconnected with power drives 62, 64 each connected with respectively one of the actuators 46 and 48. The acceleration measurement is a key attribute of this invention. The measured acceleration is used to drive the actuators in such a way that the passenger compartment remains stationary despite the motion of the under-carriage. This feedback control is achieved as follows: Upon vibrations or motions of the compartment floor 22 being sensed by the two-axis accelerometer 60; such vibrations representing heaving and swaying of the passenger compartment, which would cause discomfort and resultant annoyance by passengers riding therein, appropriate control signals are transmitted from the two-axis accelerometer 60 to the applicable actuator power drives 62, 64 so as to impart a force to respectively each of the piston-cylinder units of actuators 46 and 48 in accordance with the type of swaying or heaving motion encountered, and to thereby cause the actuators to compensate for such heaving or swaying motions responsive to increased pressure being exerted or reduction in pressure to either extend or retract the hydraulic pistons of the respective accumulators.

Reverting to the embodiment of FIGS. 4 and 4a of the drawings, illustrating an example of an active vibration damper installation 68 on a so-called tilt train, there is diagrammatically disclosed a train body 70 connected through a truck-carriage frame 72 with a wheel structure 74, a tiltable passenger compartment 76 includes connecting structure 78 adapted to be tilted by means of tilt linkage swing arms 80 from a generally horizontal position during normal travel into a tilted position, as shown, when rounding a curve during the travel of the conveyance, such as a railway train.

Provided at the lower surface of the floor 82 of the vehicle compartment 76 is a pneumatic secondary suspension spring, one on each side, such springs being identified by reference numerals 84 and 86, and whereby a two-axis active vibration damper 88, similar to element 40 of FIG. 3, is positioned between the secondary pneumatic suspension springs 84 and 86 while being mounted on an upper railway truck bolster 90. Connected to the body 70 are a pair of upwardly angularly diverging hydraulic tilt actuators 92 and 94, which in response to a tilting condition sensed by the two-axis active vibration damper 88, are adapted to be actuated by suitable actuator power drive means (not shown), in a manner similar to that illustrated in the embodiment of FIG. 3 of the drawings, so as to compensate for heaving and swaying motions encountered by the passenger compartment 76 of the tilt train.

In this instance, rather than the actuators 95, 96 being arranged in an "X" configuration, these are shown to be oriented essentially in a "V" configuration, although other orientations and angular alignments may also be considered herein, which will provide for compensating for vertically-acting heave forces and horizontally-acting sway forces at the same time as required by the particular circumstances encountered.

Thus, a vertical force is obtained by driving the actuators 95, 96 in the same direction, while a horizontal force is obtained by driving them in opposite in inverse directions. The control or actuating signals which are required to drive the actuators 95, 96 by means of the actuator power drives are derived from the two-axis accelerometer 97 which measures the vertical and horizontal acceleration levels feeding back through the actuator drive system (not shown). In that manner, it is possible to readily compensate for excess or unwanted tilt or motion and vibratory effects encountered by the passenger compartment during the travel of the train, or any moving vehicle, in both straight and curvilinear directions along roadways or railway tracks.

The dual or multiple angled piston-cylinder actuator structures 95, 96 of the inventive active motion and vibration damping system enables this compound motion or vibratory effect to be compensated for in a concurrently effected manner along different directions, unlike the structures shown in active damping systems pursuant to the current state of the art which only permit for vibration or motion damping in a single direction or orientation.

Although the foregoing active motion and vibration damping system has been described in connection with a utilization as a supplemental vibration damping system or arrangement for a passive vibration damping system, it is of course possible that it be installed in the absence of a passive system for various operating conditions and on different types of vehicles or motion structures.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A motion and vibration damping arrangement for actively controlling and attenuating vibratory dynamic forces encountered in transport vehicles and machines subjected to motion, said arrangement being interposed between relatively movable components of said transport vehicles and machines, comprising:

(a) a plurality of actuators each respectively being connected to said relatively movable components at predetermined divergent angular orientations with respect to each other;

(b) two-axis accelerometer means being fastened to one of said relatively movable components for sensing vibratory dynamic forces acting on said component; and (c) actuator power drive means operatively interconnecting said plurality of actuators and said two-axis accelerometer means, whereby said actuator power drive means actuates each of said actuators in a predetermined controlled manner so as to responsively compensate for vibratory dynamic forces sensed by said two-axis accelerometer means upon said forces acting in different directions of orientations relative to said component having said accelerometer means fasted thereto.

2. A motion and vibration damping arrangement as claimed in claim 1, wherein said relatively movable components comprise vehicular body and passenger compartment floor structures, said actuators each comprising axially extendable and retractable members having opposite ends connected to respectively each of said relatively movable components, said actuator power drive means varying the length of each of said actuators responsive to vibratory dynamic forces sensed by said accelerometer so as to compensate for and attenuate motions and vibrations encountered by said passenger compartment floor structures.

3. A motion and vibration damping arrangement as claimed in claim 1 or 2, wherein each of said actuators comprises a piston and cylinder unit.

4. A motion and vibration damping arrangement as claimed in claim 1, wherein two of said actuators are positioned in an X-shaped configuration intermediate said relatively movable components.

5. A motion and vibration damping arrangement as claimed in claim 1, wherein two of said actuators are positioned in a V-shaped configuration intermediate said relatively movable components.

6. A motion and vibration damping arrangement as claimed in claim 1, wherein said actuators are actuatable in opposed directions to counteract tilting motions of one of said relatively movable components.

7. A motion and vibration damping arrangement as claimed in claim 1, wherein a passive damping system is interposed between said relatively movable components, said active damping arrangement being installed as a supplementary damping system to said passive damping system.

8. A motion and vibration damping arrangement as claimed in claim 1, wherein said relatively movable components are constituents of a railway car, automobile, or people-moving installation.

* * * * *